Figure 1:
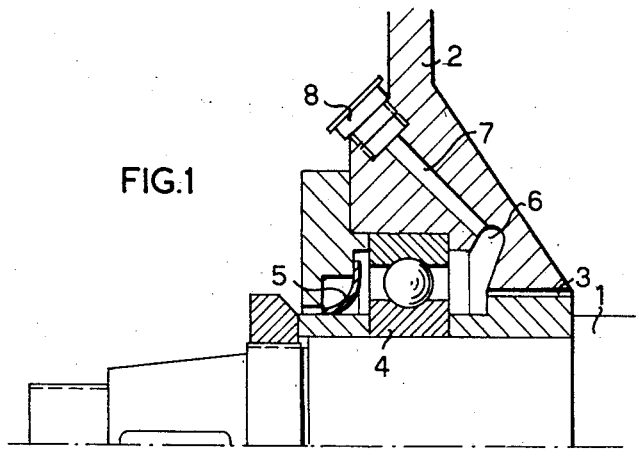

Nov. 5, 1957 J. C. LUBBERHUIZEN 2,812,456
ELECTRIC MOTOR
Filed Dec. 10, 1954

Inventor
Jan C. Lubberhuizen
By Cushman, Darby & Cushman
Attorneys

United States Patent Office 2,812,456
Patented Nov. 5, 1957

2,812,456

ELECTRIC MOTOR

Jan C. Lubberhuizen, Heerlen, Netherlands, assignor to Stamicarbon N. V.

Application December 10, 1954, Serial No. 474,316

Claims priority, application Netherlands December 18, 1953

8 Claims. (Cl. 310—88)

The present invention relates to electric motors. More specifically, the invention relates to electric motors having a flame proof casing in which a clearance passage is provided between the shaft and casing of a width and an axial extent sufficient to guard against the ignition of any explosive gas mixture which may be present outside the casing by reason of any fire or spark phenomenon occurring within the casing.

During the operation of an electric motor, the temperature of the motor varies in accordance with the load. Consequently, the air pressure in the motor casing fluctuates and the motor "breathes." When the motor is heavily loaded, its temperature rises, so that the air pressure in the motor casing also rises. In the motor construction heretofore proposed, the air flows out through the aforementioned clearance and the bearing. If the load is decreased or the motor is switched off, the temperature falls so that the air pressure in the casing is decreased and air is aspirated into the casing through the bearing and the clearance. As a result, dust particles are drawn into the bearing from the surrounding atmosphere and grease or oil is sucked from the bearing into the motor casing. This causes fouling of the bearing and the motor and leads to operating troubles.

It is an object of the invention to provide an electric motor which is particularly adapted for use in underground coal mining and which functions to substantially eliminate the dangers heretofore present in electrical motors of igniting any gas mixture that may be present in the mine.

Another object of the invention is to provide an electric motor of the flameproof type in which no oil or grease is drawn from the bearings into the motor casing and the bearings are not fouled by dust drawn in with the aspirated air.

Another object of the invention is to provide an electric motor in which dust or moisture is removed from the aspirated air.

Still another object of the invention is to provide an electric motor in which a long passage is provided for aspirated air so that the chance of dust getting into the motor casing is reduced.

These and other objects of the invention will become more apparent during the course of the following detailed description and the appended claims.

The invention may best be understood with reference to the accompanying drawings wherein illustrative embodiments are shown.

Figure 2:
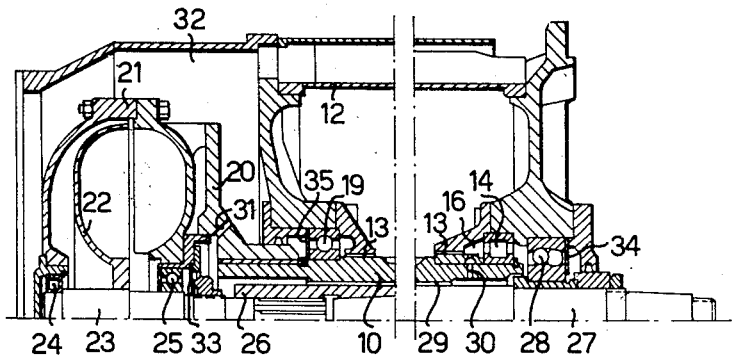

In the drawings:

Figure 1 is a fragmentary vertical sectional view taken through a motor casing at the place where the rotor shaft extends outwardly therefrom showing one form of the present invention incorporated therein; and Figure 2 is a fragmentary vertical sectional view taken through an electric motor of a modified construction embodying the principles of the present invention.

Referring now more particularly to Figure 1, there is shown an electric motor including a rotor shaft 1 which is supported in the casing 2 of the motor by means of bearings 4. Disposed inwardly of the rotor shaft bearing 4 and between the shaft 1 and the casing 2, is a clearance passage 3. The passage 3 has a width of 25 mm. whereas the difference between the diameters of the bore in the casing 2 and the shaft 1 amounts to 0.5 mm. With these dimensions, ignition of an explosive gas mixture outside the casing 2 cannot result from flame or spark phenomenon within the casing. As best shown in Figure 1, the bearing 4 is hermetically sealed off from the surrounding atmosphere by a seal 5. The passage 3 has communication with the atmosphere by an air path defined by an annular chamber 6 and an air passage 7, extending from the chamber to the atmosphere through the wall of the casing. The passage 7 is provided with suitable screw threads for mounting a filter 8 operable to separate the dust or moisture from the aspirated air. The chamber 6 could alternatively, be connected to the atmosphere via radial and axial bores in the rotor shaft 1.

When the motor is "breathing," no air is aspirated through the bearing 4, so that the bearing is not fouled by dust and no oil or grease is drawn into the motor casing 2. If desired, an extra bearing seal may be provided between the bearing 4 and the chamber 6.

In a motor where the rotor shaft passes through the motor casing on one side only, the seal at the other side may take the form of an end cover sealed to the casing wall around an annular zone surrounding the adjacent bearing.

In the known constructions, it would not be practical to prevent air from being aspirated through the bearings by applying hermetic seals due to the heavy mechanical strain on the seals resulting from the differences in the pressures on opposite sides of the seals during operation. Such heavy strain would soon impair the seals, especially in the case of motors having rotor shafts of a large diameter, operated at high speeds.

In the embodiment illustrated in Figure 2, the rotor (not shown) is mounted on a hollow rotor shaft 10, the stator (not shown) being located in the casing 12. The rotor shaft is supported in the casing 12 by bearings 14 and 19 and inwardly of each bearing there is a clearance passage 13 dimensioned to guard against ignition through the passage of an explosive gas mixture which may be present outside the casing. On one end of the rotor shaft an impeller 20 of a liquid coupling 21 is mounted. The impeller cooperates with a runner 22, mounted on a shaft 23 supported by bearings 24 and 25 carried by the impeller.

The shaft 23 is connected by any suitable means such as coupling sleeve 26, to a long shaft 27, passing through the hollow rotor shaft 10 and projecting out the other side of the motor. At this end, the shaft 27 is supported in the motor casing by a bearing 28. The projecting end of the shaft 27 is adapted to be coupled to a machine to be driven by any suitable means, as for example, by a reduction gear or the like. As the diameter of the shaft 27 is smaller than the inner diameter of the hollow rotor shaft, a long clearance passage 29 is present between the two shafts.

Between the rotor shaft bearing 14 and the clearance passage 13 remote from the couplings, there is an annular chamber 16, which, through a radial bore 30 in the rotor shaft, connects with the clearance passage 29 between the rotor shaft and the long driven shaft 27. Through a bore 31 in the hub of the impeller 20, the passage 29 connects to the space 32 around the coupling 21.

Seals 33, 34 and 35 ensure that aspiration of air into the motor casing takes place only from the space 32 through bores 30 and 31, passages 13 and 29 and the chamber 16, and that it does not take place, for example, through bearings 19 and 28.

In order to be able to rapidly eliminate pressure variations in the motor casing 12, it is sufficient for the space in the motor casing to connect to the atmosphere on one side only through a clearance passage 13. No air is aspirated through the left hand clearance passage 13 in the construction shown in Figure 2.

The space between bearings 14 and 28 is normally filled with grease and thus prevents air being aspirated around the end of the motor shaft 10 and through bearing 14. If desired, however, the motor could be designed to include a seal on the outside of bearing 14.

A drive mechanism which, as illustrated in Figure 2, comprises an electric motor mounted on a hollow rotor shaft, a fluid coupling engaged to one end of said rotor shaft and a drive shaft extending through said hollow rotor shaft, one end of said drive shaft being engaged to the turbine wheel follower of said fluid coupling, the other end of said drive shaft being adapted for driving engagement with other apparatus is described and claimed in the co-pending application Serial No. 454,425 of Jan J. Keyner, filed September 7, 1954.

It is to be understood that the form of the invention herewith shown and described is to be taken as a preferred embodiment of the same, and that various changes may be made without departing from the spirit of the invention or the scope of the appended claims.

I claim:

1. In an electric motor having a flameproof casing, a rotor shaft passing through said casing, said casing and shaft defining a clearance passage therebetween of a width and axial extent sufficient to guard against the ignition of any explosive gas that may be present outside the casing by reason of any fire or spark phenomenon occurring within the casing, a shaft bearing disposed outside said casing and outwardly of said clearance passage, seal means for said bearing preventing the aspiration of air into the motor through said bearing, and means defining an air path for communicating the outer end of said clearance passage with the atmosphere surrounding the casing.

2. An electric motor as defined in claim 1 wherein said air path defining means includes an aperture extending through said casing.

3. An electric motor as defined in claim 1 wherein said air path defining means includes a bore in said rotor shaft.

4. An electric motor as defined in claim 1 wherein said air path defining means includes an enlarged annular space between the outer end of said clearance passage and said bearing.

5. An electric motor as defined in claim 1 wherein means is provided in association with said air path defining means for separating dust or moisture from air aspirated into the motor casing.

6. An electric motor as defined in claim 1 wherein said rotor shaft is hollow and is connected on the side of said motor remote from said bearing to an inner shaft, and wherein said air path defining means includes a clearance space between said rotor shaft and said inner shaft.

7. An electric motor as defined in claim 6 wherein said air path defining means further includes a radial bore in said rotor shaft communicating between said clearance passage and said clearance space.

8. An electric motor as defined in claim 6 wherein a fluid coupling element is fixedly connected with said rotor shaft and wherein said air path defining means further includes an opening in said coupling element communicating one end of said clearance space with the atmosphere.

References Cited in the file of this patent

UNITED STATES PATENTS

| 1,704,233 | Wyman | Mar. 5, 1929 |
| 2,323,146 | Manney | June 29, 1943 |

FOREIGN PATENTS

| 805,408 | Germany | May 17, 1951 |